(12) United States Patent
Mese et al.

(10) Patent No.: US 11,334,138 B1
(45) Date of Patent: May 17, 2022

(54) UNLOCKING AND/OR AWAKENING DEVICE BASED ON ULTRA-WIDEBAND LOCATION TRACKING

(71) Applicant: Lenovo (Singapore) Pte. Ltd., Singapore (SG)

(72) Inventors: John Carl Mese, Cary, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/204,543

(22) Filed: Mar. 17, 2021

(51) Int. Cl.
*G06F 1/32* (2019.01)
*G06F 1/3206* (2019.01)
*G06F 1/3234* (2019.01)
*H04W 4/02* (2018.01)
*H04B 1/38* (2015.01)

(52) U.S. Cl.
CPC .......... *G06F 1/3206* (2013.01); *G06F 1/3234* (2013.01); *H04W 4/023* (2013.01); *H04B 1/38* (2013.01)

(58) Field of Classification Search
CPC ....................................................... G06F 1/32
See application file for complete search history.

(56) References Cited

U.S. PATENT DOCUMENTS

| | | |
|---|---|---|
| 10,841,174 B1 | 11/2020 | Ely et al. |
| 2007/0109093 A1 | 5/2007 | Matsubara et al. |
| 2010/0048172 A1 | 2/2010 | Karaoguz |
| 2011/0037712 A1 | 2/2011 | Kim et al. |
| 2014/0253288 A1 | 9/2014 | O'Brien et al. |
| 2015/0355708 A1 | 12/2015 | Lee et al. |
| 2018/0348844 A1* | 12/2018 | Lingutla ............... G06F 1/3231 |
| 2019/0130175 A1 | 5/2019 | Nakashima et al. |
| 2019/0228601 A1 | 7/2019 | Grzenda et al. |
| 2020/0228943 A1 | 7/2020 | Martin et al. |
| 2020/0314651 A1 | 10/2020 | Pirch et al. |
| 2020/0327753 A1 | 10/2020 | Leiterer et al. |
| 2021/0082221 A1 | 3/2021 | Zhang et al. |
| 2021/0117521 A1* | 4/2021 | Gorsica .................... G06F 21/32 |
| 2021/0158637 A1* | 5/2021 | Kincaid .................. H04W 4/80 |
| 2021/0185485 A1 | 6/2021 | Deixler et al. |
| 2021/0306799 A1 | 9/2021 | Kim et al. |

(Continued)

OTHER PUBLICATIONS

"Building Digital Key Solution for Automotive", CarConnectivity consortium, retrieved from https://carconnectivity.org/wp-content/uploads/CCC-Digital-Key-White-Paper.pdf.

(Continued)

*Primary Examiner* — Paul B Yanchus, III
(74) *Attorney, Agent, or Firm* — John M. Rogitz; John L. Rogitz

(57) ABSTRACT

In one aspect, a first device may include at least one processor, an ultra-wideband (UWB) transceiver accessible to the at least one processor, and storage accessible to the at least one processor. The storage may include instructions executable by the at least one processor to track a location of a second device different from the first device using one or more UWB signals received from the second device via the UWB transceiver. The instructions may also be executable to unlock and/or awaken the first device responsive to a determination, based on the tracking of the location of the second device, that the second device is within a predetermined area of the first device.

20 Claims, 7 Drawing Sheets

(56) References Cited

U.S. PATENT DOCUMENTS

2021/0409896 A1  12/2021  Ahn et al.
2022/0026920 A1  1/2022  Afrouzi et al.

OTHER PUBLICATIONS

"Car Connectivity Consortium Unveils New Features for Digital Key Specification", Car Connectivity Consortium, Oct. 8, 2019, retrieved from https://carconnectivity.org/press-release/car-connectivity-consortium-unveils-new-features-for-digital-key-specification/.
"Digital Key", Car Connectivity Consortium, 2018, retrieved from https://carconnectivity.org/digital-key/.
"Smart Phone Digital Key", Car Connectivity Consortium, 2018, retrieved from https://carconnectivity.org/wp-content/uploads/CCC-Digital-Key-Brochure.pdf.
"Whitepaper—Digital Key—The Future of Vehicle Access", CarConnectivity Consortium, 2020, retrieved from https://carconnectivity.org/wp-content/uploads/2020/03/CCC_Digital_Key_2.0.pdf.
Jakes et al., "Ultra-Wideband to Identify and Control Other Device", file history of related U.S. Appl. No. 17/204,900, filed Mar. 17, 2021.
Jakes et al., "Unlocking Lock on Device Based on Ultra-Wideband Location Tracking", file history of related U.S. Appl. No. 17/204,617, filed Mar. 17, 2021.
Mese et al., "Ultra-Wideband Location Tracking to Perform Voice Input Operation", file history of related U.S. Appl. No. 17/205,265, filed Mar. 18, 2021.
Mese et al., "Ultra-Wideband-Based Device Using Restrictions", file history of related U.S. Appl. No. 17/204,844, filed Mar. 17, 2021.
"FiRa Consortium", Wikipedia, retrieved from https://en.wikipedia.org/wiki/FiRa_Consortium on Feb. 16, 2021.
"Smart Home and Consumer", Fira: The Power to be Precise. Retrieved from https://www.firaconsortium.org/discover/use-cases/smart-home-consumer on Feb. 26, 2021.
"Speech to Text: A Speech service feature that accurately transcribes spoken audio to text", Microsoft Azure, retrieved from https://azure.microsoft.com/en-us/services/cognitive-services/speech-to-text/ on Feb. 26, 2021.
"Ultra-Wideband Technology", Infsoft, retrieved from https://www.ultrawideband.io/en/technology.php on Feb. 16, 2021.
"Ultra-wideband", Wikipedia, retrieved from https://en.wikipedia.org/wiki/Ultra-wideband on Feb. 16, 2021.
Wilhite, Tamara, "An Introduction to UWB Antennas", Turbo Future, Jan. 14, 2021, retrieved from https://turbofuture.com/misc/An-Introduction-to-UWB-Antennas.
Zwirello et al., "UWB Localization System for Indoor Applications: Concept, Realization and Analysis", Hindawi Publishing CorporationJournal of Electrical and Computer Engineering, vol. 2012, May 28, 2012. Retrieved from https://www.hindawi.com/jounals/jece/2012/849638/.
Jakes et al., "Unlocking Lock on Device Based on Ultra-Wideband Location Tracking", related U.S. Appl. No. 17/204,617, Non-Final Office Action dated Sep. 7, 2021.
Jakes et al., "Unlocking Lock on Device Based on Ultra-Wideband Location Tracking", related U.S. Appl. No. 17/204,617, Applicant's response to Non-Final Office Action filed Nov. 22, 2021.
Jakes et al., "Unlocking Lock on Device Based on Ultra-Wideband Location Tracking", related U.S. Appl. No. 17/204,617, Final Office Action dated Jan. 25, 2022.
Jakes et al., "Ultra-Wideband to Identify and Control Other Device", related U.S. Appl. No. 17/204,900, Non-Final Office Action dated Mar. 11, 2022.
Jakes et al., "Unlocking Lock on Device Based on Ultra-Wideband Location Tracking", related U.S. Appl. No. 17/204,617, Applicant's response to Final Office Action dated Mar. 3, 2022.
Jakes et al., "Unlocking Lock on Device Based on Ultra-Wideband Location Tracking", related U.S. Appl. No. 17/204,617, Non-Final Office Action dated Mar. 28, 2022.
Jakes et al., "Unlocking Lock on Device Based on Ultra-Wideband Location Tracking", related U.S. Appl. No. 17/204,617, Non-Final Office Action response dated Apr. 7, 2022.

\* cited by examiner

UNLOCKING AND/OR AWAKENING DEVICE BASED ON ULTRA-WIDEBAND LOCATION TRACKING

FIELD

The disclosure below relates to technically inventive, non-routine solutions that are necessarily rooted in computer technology and that produce concrete technical improvements. In particular, the disclosure below relates to techniques for unlocking and/or awakening a device based on ultra-wideband (UWB) location tracking.

BACKGROUND

As recognized herein, most modern electronics devices are not equipped with features that allow sufficient fine-grain location tracking indoors. As such, and also recognized herein, accurate human presence detection for performing various device operations is highly frustrated. There are currently no adequate solutions to the foregoing computer-related, technological problem.

SUMMARY

Accordingly, in one aspect a first device includes at least one processor, an ultra-wideband (UWB) transceiver accessible to the at least one processor, and storage accessible to the at least one processor. The storage includes instructions executable by the at least one processor to track a location of a second device different from the first device using one or more UWB signals received from the second device via the UWB transceiver. The instructions are also executable to unlock and/or awaken the first device responsive to a determination, based on the tracking of the location of the second device, that the second device is within a predetermined area of the first device.

In some examples, the first device may include a display accessible to the at least one processor, and the predetermined area may be an area in a particular direction relative to a front of the display of the first device. Additionally, or alternatively, the predetermined area may be an area extending from a particular side of the first device but not all sides of the first device.

In some example implementations, the instructions may be executable to, responsive to the determination, unlock the first device so that the device can be used by a user without the user entering a passcode or password to unlock the first device.

Also, in some example implementations, the instructions may be executable to, responsive to the determination, awaken the first device. The first device may be awakened from a sleep state, hibernate state, and/or off state. Additionally, or alternatively, the first device may include a display accessible to the at least one processor and the first device may be awakened at least by controlling the display to go from a state in which the display is not presenting one or more images to a state in which the display is presenting one or more images.

Still further, in some example embodiments the instructions may be specifically executable to unlock and/or awaken the first device responsive to a determination, based on the tracking of the location of the second device, that the second device is within the predetermined area of the first device for at least a threshold non-zero amount of time.

Still further, if desired the instructions may be executable to determine that the second device is currently being used by a user and, responsive to the determination that the second device is currently being used by the user, lock the first device notwithstanding the second device being currently within the predetermined area. Additionally, or alternatively, responsive to the determination that the second device is currently being used by the user, the instructions may be executable to place the first device in a lower power mode notwithstanding the second device being currently within the predetermined area. The lower power mode may include a sleep state, hibernate state, and/or off state. In addition to or in lieu of that, the lower power mode may include the display not presenting one or more images.

Still further, in some examples the first device may be a voice-activated device. In these examples, the instructions may be executable to, responsive to the determination, process audible input of a command without receiving a wake-up word to process the audible input. The wake-up word may be different from the audible input itself.

In another aspect, a method includes tracking, using a first device, a location of a second device different from the first device using ultra-wideband (UWB) communication. The method also includes, based on the tracking of the location of the second device, unlocking and/or awakening the first device.

So, for example, the method may include determining that at least one condition has been met based on the tracking of the location of the second device, and then unlocking and/or awakening the first device based on the at least one condition being met. The at least one condition being met may include the second device being within a predetermined area of the first device. The predetermined area may be an area in front of a display of the first device and may not include any area behind the display of the first device. Additionally, in some examples the method may further include determining that the second device is outside the predetermined area for at least a threshold amount of time and then locking the first device and/or placing the first device in a lower power mode responsive to determining that the second device is outside the predetermined area for at least the threshold amount of time. However, also note that the at least one condition being met may include a motion vector for the second device indicating motion toward a display of the first device, where the motion toward the display may be motion orthogonal to a front face of the display plus or minus fifteen degrees. The motion vector may be determined from the tracking.

In still another aspect, at least one computer readable storage medium (CRSM) that is not a transitory signal includes instructions executable by at least one processor to track a location of a first device relative to a second device using ultra-wideband (UWB) communication and to, based on the tracking of the location of the first device, lock the second device and/or place the second device in a lower power mode.

So, in some example implementations, the instructions may be executable to, based on the tracking of the location of the first device, determine that the first device is not within a predetermined area of the second device for at least a threshold amount of time. The predetermined area may include space in front of a display of the second device. In these implementations, the instructions may then be executable to lock the first device and/or place the first device in the lower power mode responsive to the determination.

The details of present principles, both as to their structure and operation, can best be understood in reference to the accompanying drawings, in which like reference numerals refer to like parts, and in which:

DETAILED DESCRIPTION

Figure 1:
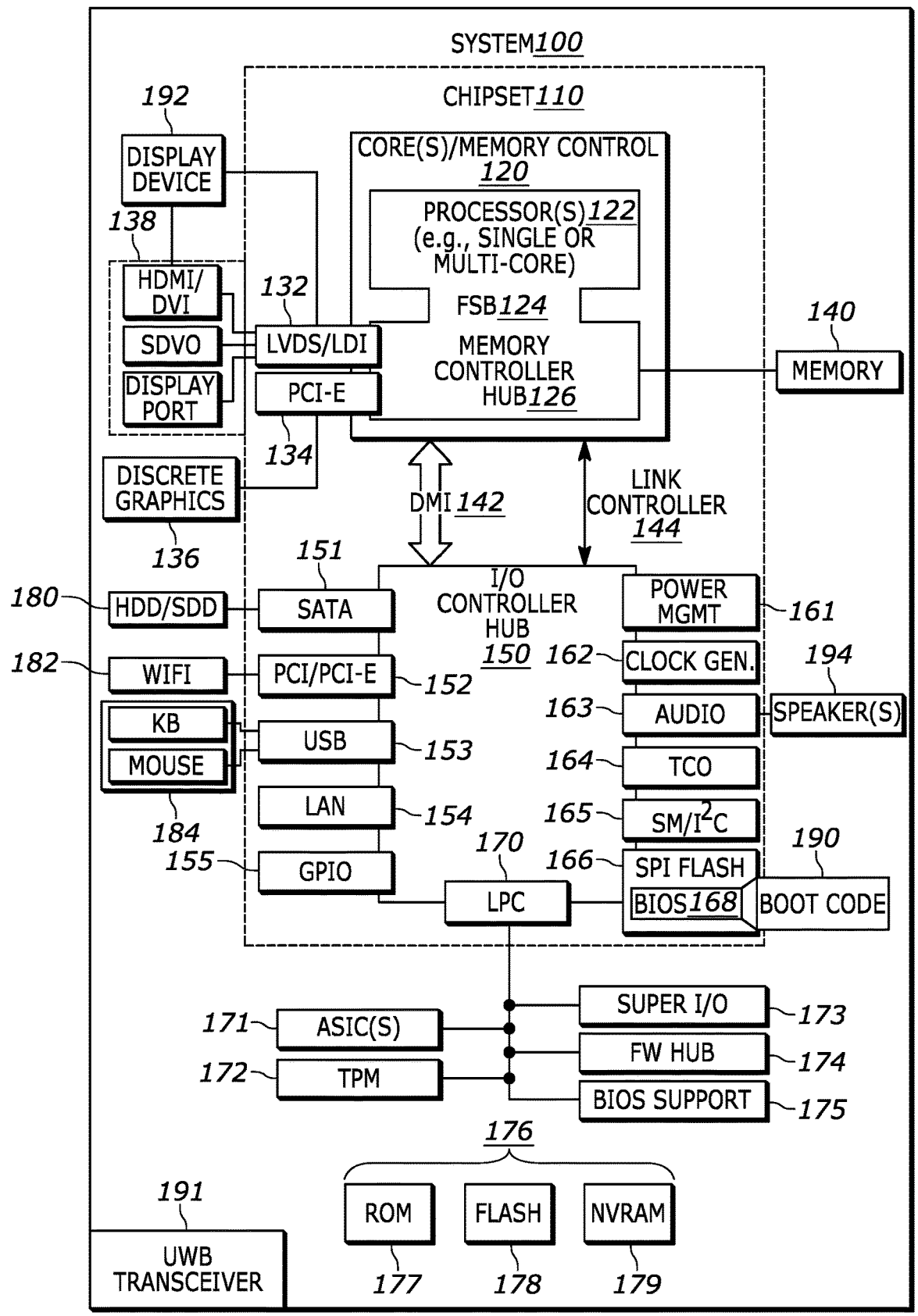
FIG. 1 is a block diagram of an example system consistent with present principles.

Among other things, the detailed description below discusses use of an ultra-wideband (UWB) transmitter-receiver pairing (e.g., PC to cell phone) to isolate human presence detection (HPD) to relevant user(s) in a potentially crowded environment. This may be coupled with other HPD sensor technologies and/or used as a proxy for devices without other HPD sensors.

In using UWB for HPD as set forth further below, accurate user approaching and leaving scenarios can be achieved even in a crowded environment that might otherwise trigger a false positive. Additionally, HPD consistent with present principles may trigger a device when a user is standing in front of the device at their desk but still not when the user is next to or a few feet away from the device. HPD as disclosed herein may also avoid triggering the device when the user is walking by the device sitting on their desk but still trigger the device upon actual user approach or departure. Also consistent with present principles, HPD can avoid triggering the device when the user is standing behind the device at their desk (e.g., like in a next row of cubicles). Still further, if a second UWB-enabled and paired device is in active use, the first device may use a timeout/decay to be software-locked when the second device is used for a threshold amount of time. Additionally, note here that paired devices may be devices that are linked to communicate with each other to control local operations of the other device.

Still further, the detailed disclosure below also discusses triggering HPD functions for voice-activated devices. For example, as disclosed herein, if a user is standing in front of a voice-activated device as determined based on UWB signals, the user may be able to bypass the voice-activated device's wake-up word and simply speak a command for the voice-activated device to execute.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include an ultra-wideband (UWB) transceiver 191 configured to transmit and receive data using UWB signals and UWB communication protocol(s), such as protocols set forth by the FiRa Consortium. As understood herein, UWB may use low energy, short-range, high-bandwidth pulse communication over a relatively large portion of the radio spectrum. Thus, for example, an ultra-wideband signal/pulse may be established by a radio signal with fractional bandwidth greater than 20% and/or a bandwidth greater than 500 MHz. UWB communication may occur by using multiple frequencies (e.g., concurrently) in the frequency range from 3.1 to 10.6 GHz in certain examples.

To transmit UWB signals consistent with present principles, the transceiver 191 itself may include one or more Vivaldi antennas and/or a MIMO (multiple-input and multiple-output) distributed antenna system, for example. It is to be further understood that various UWB algorithms, time difference of arrival (TDoA) algorithms, and/or angle of arrival (AoA) algorithms may be used for system 100 to determine the distance to and location of another UWB transceiver on another device that is in communication with the UWB transceiver on the system 100 to thus track the real-time location of the other device.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
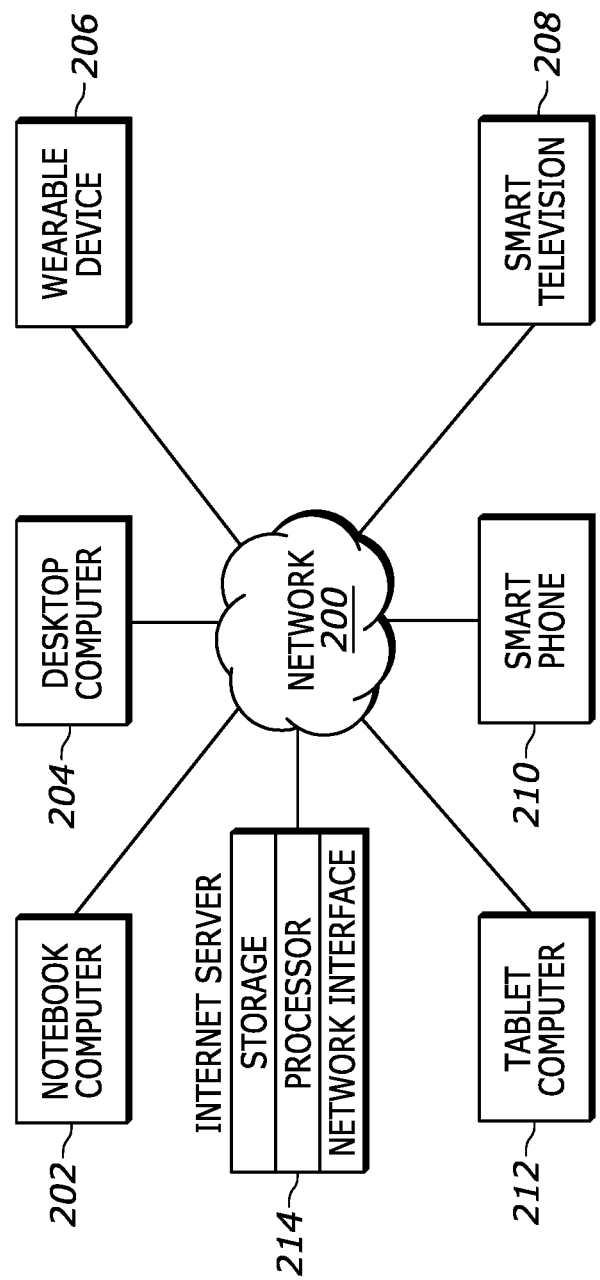
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 and/or UWB to undertake present principles.

Figure 3:
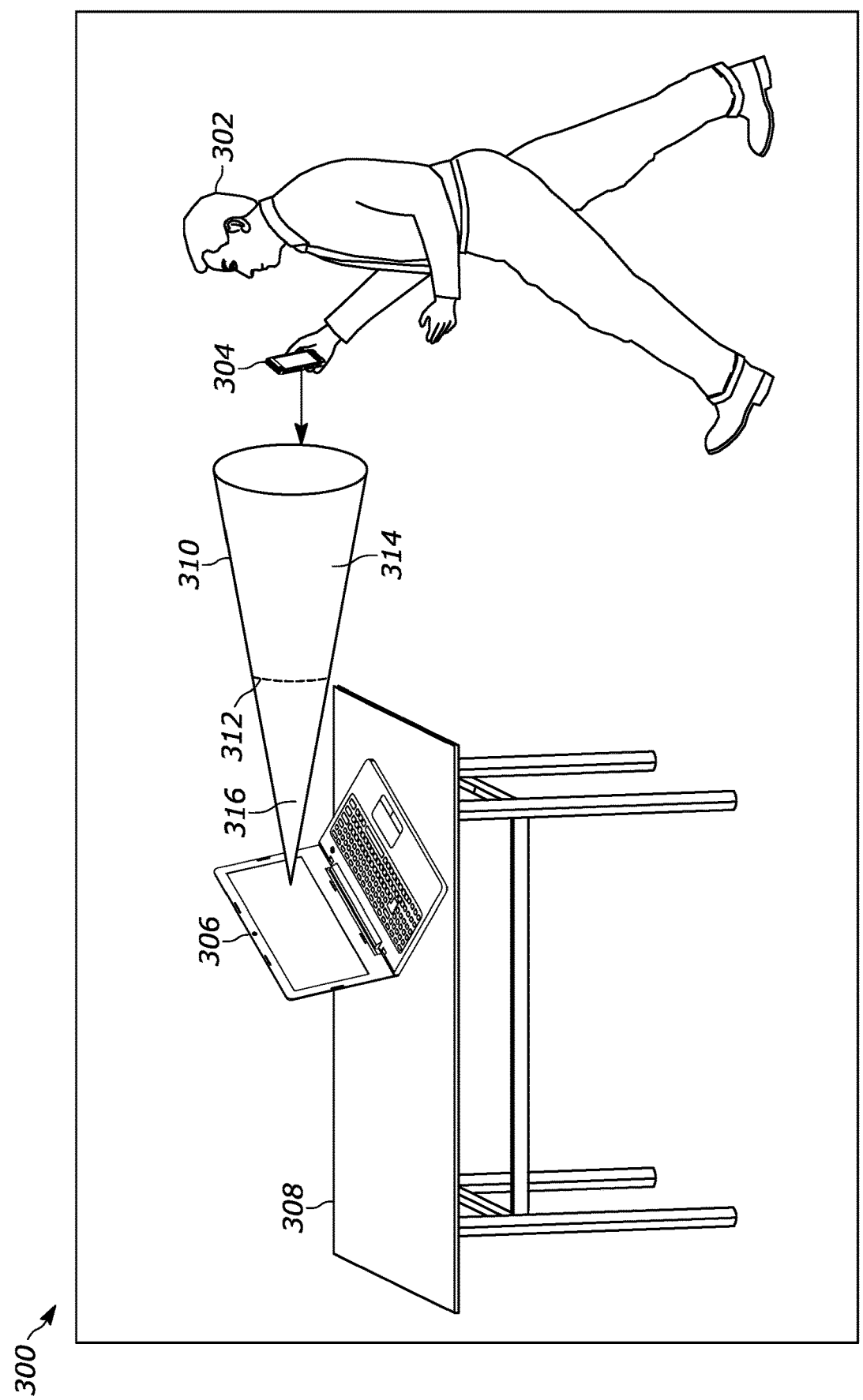
FIG. 3 is an example illustration of an end-user with a smartphone approaching a laptop computer for the laptop to awaken and/or unlock based on UWB location tracking consistent with present principles.

Now in reference to the example illustration 300 shown in FIG. 3, suppose an end-user 302 is holding his or her smartphone 304 in one hand while walking toward a laptop computer 306 sitting on a table 308. Based on UWB signals transmitted by the phone 304 to the laptop 306, a processor in the UWB transceiver on the laptop 306 (or another possibly low power processor in the laptop 306) may track the location of the phone 304 in real time as the phone 304 moves about the environment to determine whether to awaken and/or unlock the laptop 306. However, also note that in some examples the phone 304 may track its own location with respect to the laptop 306 based on UWB signals transmitted between the two devices to then send a wake-up command and/or unlock command to the laptop 306 responsive to one or more of the conditions below being met.

In any case, once the laptop 306 (or phone 304) determines that the phone 304 has entered a predetermined area 310 in front of the laptop 306, the laptop 306 may wake itself up and/or unlock itself so that no passcode or password is required to be input by the user 302 in order for the user 302 to fully use the laptop 306. Awakening the laptop 306 may include awakening the laptop 306 from a sleep state, hibernate state, and/or off state. In various examples, a sleep state may be a state in which the laptop 306 is in a lower power mode with the central processing unit (CPU) possibly off but data still being maintained in RAM that still has power. Also, in various examples, a hibernate state may be a state in which the laptop's CPU may be off and a current RAM state and associated RAM data may be stored in persistent storage like a hard disk drive or solid-state drive so that the RAM, CPU, and persistent storage may all be powered down/off. Also, in various examples, an off state may be a state in which the laptop 306 has been shut down and no data is maintained in RAM, nor current RAM state/data saved in persistent storage.

However, further note that in various examples, in addition to or in lieu of the paragraph immediately above, awakening the laptop 306 may also include the laptop 306 controlling its display to go from a state in which the display is not presenting one or more images (and the display is possibly but not necessarily powered off completely) to a state in which the display is presenting one or more images (including possibly powering on the display).

Referring again to the area 310, note that the area 310 as illustrated may be virtual in that the user 302 would not be able to see the cone of the area 310 but the phone 304 entering the area 310 as tracked by the laptop 306 may still be a trigger for the laptop 306 to nonetheless awaken and/or unlock. The vertex of the cone for the area 310 may extend outward from a center point of the display of the laptop 306, for example, so that the area 310 does not include any area behind the display of the laptop 306 as positioned on the table 308.

In this way, only when the user 302 approaches the laptop 306 from a particular direction relative to the front of the laptop's display and enters the three-dimensional cone-shaped area 310 with the phone 304 does the laptop 306 wake up and/or unlock (e.g., unlock its software lock and log the user in to the laptop 306). This may be helpful so that unintentional triggers are not provided for awakening or unlocking, like if the user 302 were to be walking around the backside of the display on another side of the table 308. Additionally, to further avoid false triggers, in some examples the laptop 306 may require that the phone 304 be located continuously in the area 310 for at least a threshold non-zero amount of time so that the phone 304 entering the area 310 for a mere moment does not trigger an unintentional awakening or unlocking of the laptop 306. To accomplish this, three seconds may be sufficient for the threshold amount of time, for example.

Additionally, note that the predetermined area 310 may be an area extending from a particular side of the upper panel of the laptop 306 having the display but may not extend from all sides of the upper panel. However, further note that if the device were instead a tablet computer or smartphone or other device sitting upright so that its display was oriented similar to how the laptop's display is oriented as shown in FIG. 3, the predetermined area 310 may still extend from the front face of the display of that device but still not all sides of that device.

Also note that in addition to or in lieu of the smartphone 304 entering the area 310 to trigger the laptop 306 to awaken and/or unlock, still other conditions may be met to awaken and/or unlock the laptop 306. For example, again using UWB location tracking, the laptop 306 may track the real-time current location of the phone 304 to identify a motion vector from the smartphone 304 toward the laptop 306 that indicates motion of the phone 304 with respect to the display of the laptop 306. Again, to avoid false triggers, the motion vector may need to satisfy a threshold to trigger the laptop 306 to awaken and/or unlock, such as for example the motion vector indicating motion of the phone 304 toward the front face of the laptop display from a direction in front of the front face, such that the motion is orthogonal to the front face plus or minus fifteen degrees in the X and/or Y dimension.

Additionally, note that in some examples to further avoid false triggers, motion vector tracking may be combined with use of the area 310 so that both conditions would have to be met in order to trigger an awakening or unlocking of the laptop 306. This might be helpful where, for example, the user 302 walks sideways in front of the laptop 306 while doing something else and the phone 304 temporarily enters the area 310, but the motion vector indicates motion parallel to the front face of the display (or at least not orthogonal to the face of the display plus/minus fifteen degrees). Thus, a false trigger would be averted.

However, recognizing that there may still be instances where the user 302 may walk from a side direction toward the laptop 306 with the intention to use the laptop 306, in some examples the cone of the area 310 may be divided as shown by line 312 so that satisfying both the motion vector condition and area condition may be required to trigger awakening and/or unlocking of the laptop 306 for the outer frustoconical portion 314 of the area 310, but the device 304 entering the inner conical portion 316 of the area 310 regardless of motion vector may also still trigger awakening and/or unlocking of the laptop 306.

Figure 4:
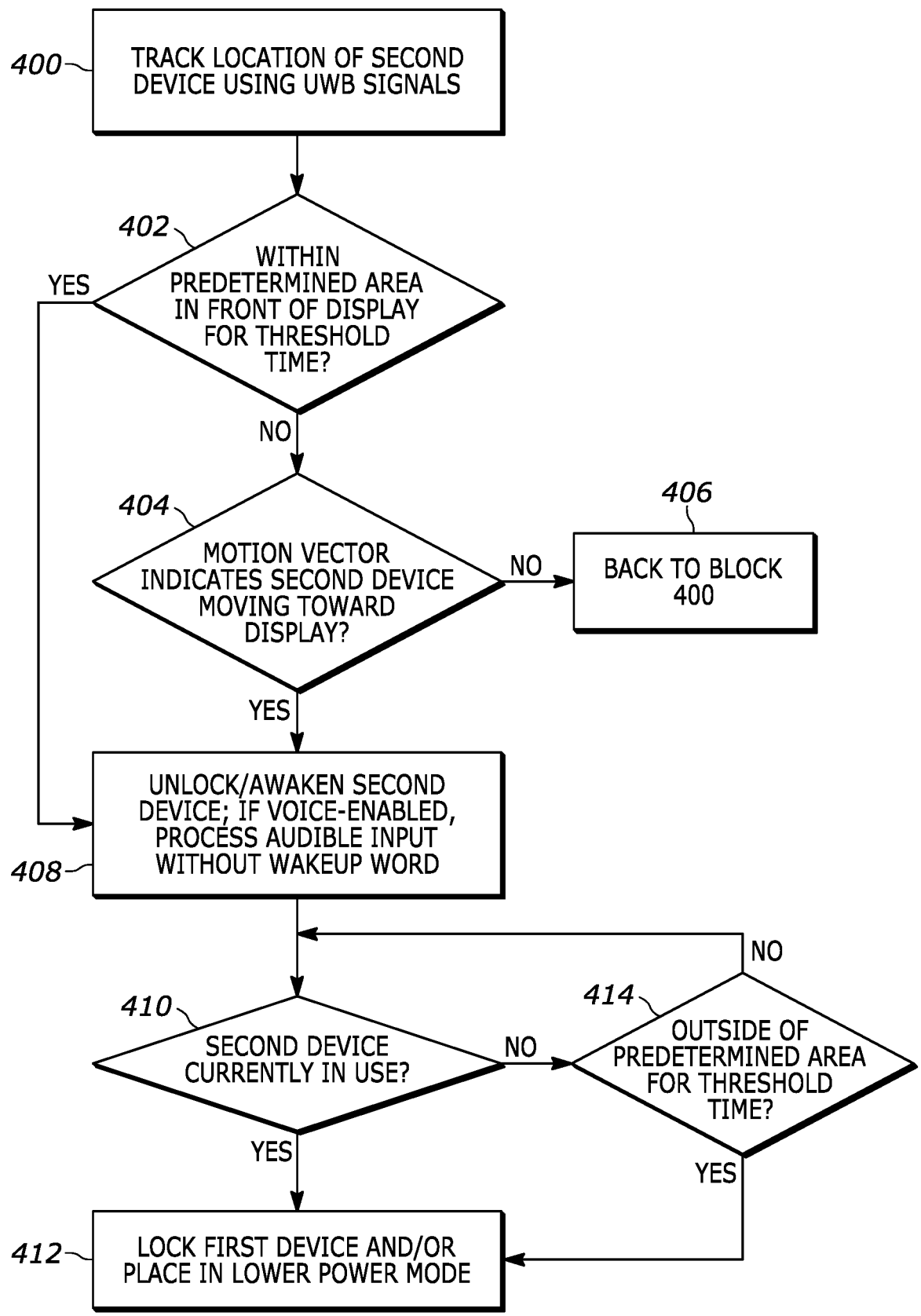
FIG. 4 illustrates example logic in example flow chart format that may be executed by a device performing UWB location tracking consistent with present principles.

Continuing the detailed description in reference to FIG. 4, it shows example logic that may be executed by a first device such as the system 100 or laptop 306 consistent with present principles. Note that while the logic of FIG. 4 is shown in flow chart format, state logic or other suitable logic may also be used. Also note that in some examples, the logic of FIG. 4 may be executed by a device that is currently in a lower power mode and/or software-locked, and that a processor other than the device's CPU may execute the logic, such as a processor in the device's UWB transceiver or a low-power microprocessor somewhere else within the device that is receiving real-time data from the UWB transceiver.

Beginning at block 400, the first device may track a location of a second device using UWB signals received from the second device. The second device might be the smartphone 304 from the example above or another type of personal device such as a wearable smartwatch, tablet computer, electronic glasses, or augmented reality (AR) or virtual reality (VR) headset, etc.

The logic may then proceed to decision diamond 402 where the first device may determine whether the second device is within a predetermined area in front of the display of the first device such as the area 310 in front of the display of the laptop 306 (e.g., for a threshold amount of time). An affirmative determination may cause the logic to proceed to block 408 as will be described shortly. However, first note that responsive to a negative determination at diamond 402, the logic may instead proceed to decision diamond 404.

At diamond 404 the first device may determine whether a motion vector for the second device (e.g., as discussed above) as determined using UWB location tracking indicates motion of the second device toward a display of the first device from in front of the first device relative to the front face of its display. A negative determination at diamond 404 may cause the logic to proceed to block 406, whereupon the logic may revert back to block 400 and continue again from there.

However, note that an affirmative determination at diamond 404 may instead cause the logic to proceed to block 408. At block 408 the first device may awaken itself (e.g., power on its display, RAM, persistent storage, and CPU). Additionally, or alternatively, at block 408 the first device may also unlock itself so that a user is logged in and can use the first device to browse the Internet, launch applications, etc. without entering a passcode or password. Still further, in some examples at block 408 the first device may cease presenting a screen saver if the display is still on and return to a desktop screen or a most-recently used screen for the first device (e.g., a word processing file that was last-used by the user before the device was software-locked and/or placed in the lower power mode).

Further still, note that in some examples the first device may be a voice-activated device such as a laptop or smartphone with a digital assistant application like Apple's Siri, Amazon's Alexa, or Google's Assistant. Or the first device may be a stand-alone digital assistant device. In any case, in some examples responsive to an affirmative determination at either of diamonds 402 or 404, at block 408 the first device may activate its microphone (if not already activated) and listen for a verbal command from a user to execute at the first device. The verbal command may be to control an Internet of Things (IoT) lamp or other device that is nearby, to provide an audible weather report to the user, etc. Thus, at block 408 the first device may listen for the command without first recognizing a wake-up word as being uttered by the user as might otherwise be required to trigger the voice assistant to listen for an ensuing command. The wake-up word might be something like "Hey assistant", for example.

To illustrate, suppose the user walks right up to the front of the first device to provide a verbal command to its digital assistant. Based on UWB location tracking, the first device may know with a relatively high degree of confidence that the user intends to provide audible input of a command once the user's smartphone on their person enters the area and/or satisfies the motion vector condition discussed above. Therefore, a wake-up word would not be necessary to avoid unintentional triggers of the assistant and the first device may simply listen for an ensuing command and ultimately process the audible input of the command.

Still in reference to FIG. 4, from block 408 the logic may then proceed to decision diamond 410. At diamond 410 the first device may determine whether the second device itself is currently in use by the user (e.g., for at least a threshold amount of time such as five seconds to avoid false triggers). Whether the second device is currently in use may be determined based on paired Bluetooth or other communication between the two devices, for example. Or the second device may transmit, via UWB signals or other wireless signals, its current processes and/or device status to the first device.

The second device currently being in use may include providing touch input to the display of the second device, the second device presenting audio visual content like an Internet video streamed to the second device, the second device's camera being currently in use, etc. Responsive to an affirmative determination at diamond 410, the logic may proceed to block 412 where the first device may software-lock itself (e.g., so that a passcode or password would be needed to access some or all functions of the first device like using the first device's guest or native operating system to execute various tasks), and/or place itself in a lower power mode such as sleep state, hibernate state, or off state (and/or place the first device's display in an off mode or lower power mode where it does not present images). The first device may do so notwithstanding the second device being currently within the predetermined area in order to secure the first device while the user's attention is diverted elsewhere (to the second device in active use). Then once the display of the second device is powered off or the user otherwise stops using the second device, the first device may awaken and/or unlock itself again (assuming the second device is still within the predetermined area in front of the first device, for example).

However, referring back to diamond 410, if a negative determination is made rather than an affirmative one, the logic may instead proceed to decision diamond 414. At diamond 414 the first device may determine, based on UWB location tracking, whether the second device is now outside of the predetermined area (e.g., for at least a threshold amount of time such as five seconds, to avoid false triggers again). Additionally, or alternatively, at diamond 414 the first device may determine whether a motion vector for the second device identified via UWB location tracking indicates motion away from the first device (e.g., in any direction), or motion away from the first device so long as not also within the inner conical portion 316 described above.

Responsive to a negative determination at diamond 414, the logic may revert back to diamond 410 and proceed therefrom. However, responsive to an affirmative determination at diamond 414, the logic may instead proceed to block 412 as described above so that the first device may be software-locked and/or placed in a lower power mode.

Figure 5:
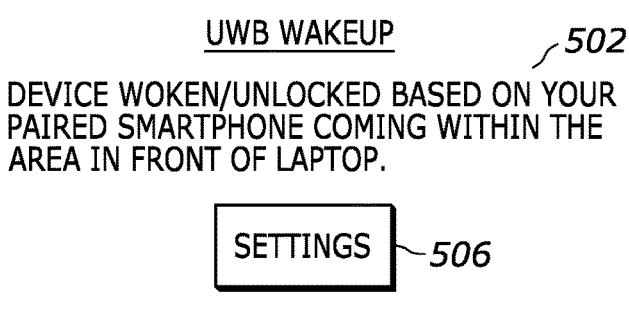
FIGS. 5, 7, and 8 show various example graphical user interfaces (GUIs) that may be presented at various times based on UWB location tracking consistent with present principles.

Now in reference to FIG. 5, a graphical user interface (GUI) 500 is shown that may be presented on the display of the first device of FIG. 4 based on the first device being awakened and/or unlocked due to UWB communication with a second device. As shown, the GUI 500 may include a prompt 502 indicating that the first device has been woken up and/or unlocked based on a paired smartphone coming within a predetermined area in front of the first device (where the first device may again be a laptop in various examples). The GUI 500 may also include a selector 506 which may be selectable to command the first device to present another GUI from which one or more settings related to UWB location tracking for awakening and/or unlocking may be configured. An example of such a settings GUI is shown in FIG. 6.

Figure 6:
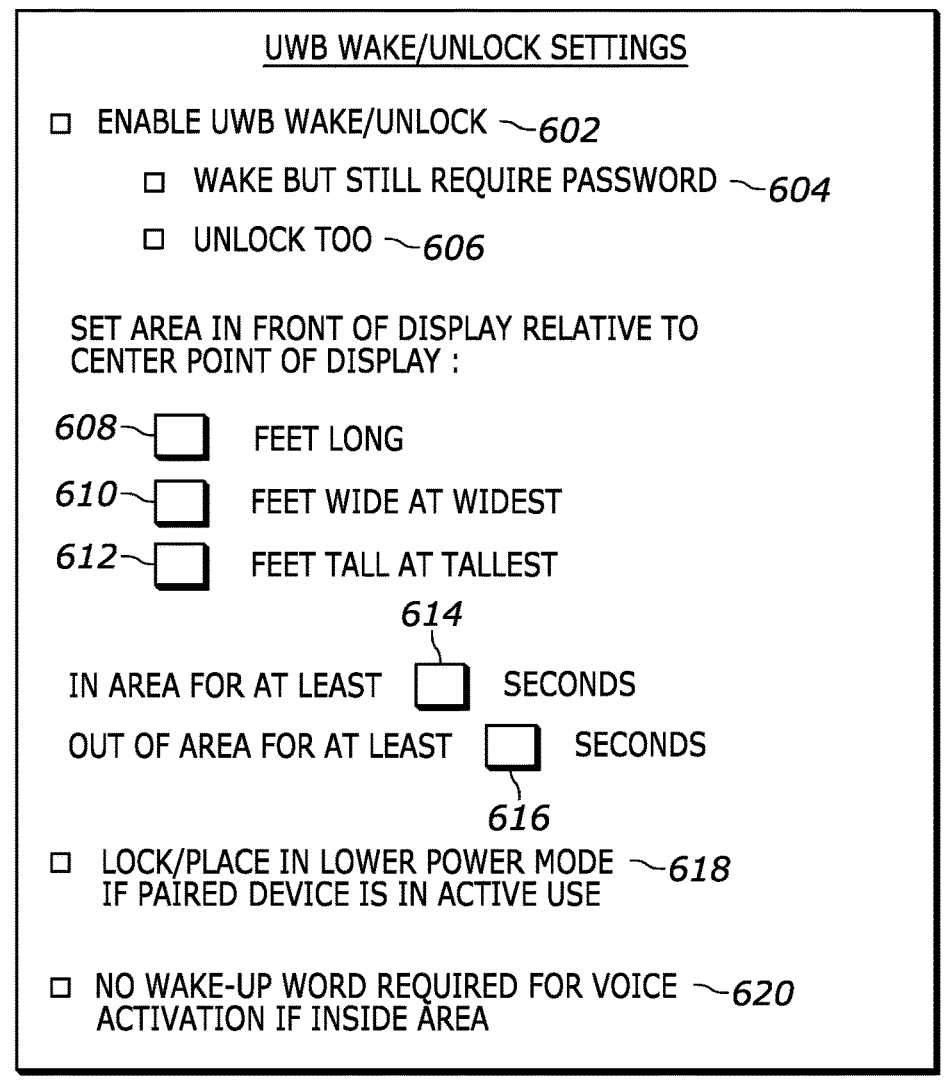
FIG. 6 shows an example GUI that may be presented to configure one or more settings of a device to operate consistent with present principles.

Accordingly, reference is now made to the GUI 600 of FIG. 6. Note that each of the options or sub-options to be discussed below may be selected by directing touch or cursor input to the respective check box adjacent to the respective option or sub-option.

As shown in FIG. 6, the GUI 600 may include a first option 602 that may be selectable to set or configure the first device to, in the future, perform UWB location tracking of other devices to determine whether to awaken and/or unlock the first device consistent with present principles. For example, the option 602 may be selected to enable the device to execute the logic of FIG. 4 and/or present the GUI 500 of FIG. 5 or GUIs 700 and 800 that will be described later.

If desired, in some examples the option 602 may be accompanied by sub-options 604, 606. Sub-option 604 may be selected to set or enable the first device to, upon determining that at least one condition related to the second device is satisfied as set forth above (e.g., coming within the predetermined area 310), wake the first device from a lower power mode but still require a user to enter a password or passcode to actually use the first device. However, instead of selecting the sub-option 604, the user may elect to select the sub-option 606 instead. The sub-option 606 may be selected to set or enable the first device to both awaken itself and unlock itself upon determining at least one condition related to the second device has been satisfied.

As also shown in FIG. 6, the GUI 600 may also include respective input boxes 608, 610, 612 at which the user may respectively enter respective numbers to establish the dimensions of the cone of the predetermined area 310 as discussed above in relation to FIG. 3. As shown in FIG. 6, box 608 may be used to enter a number of feet for the first device to use for the length of the cone, while box 610 may be used to enter a number of feet to use for the width of the cone at its widest (e.g., at the cone's base or circular plane surface). Likewise, box 612 may be used to enter a number of feet for the first device to use for the height of the cone (e.g., again at the cone's base or circular plane surface). Thus, note that the cone need not be symmetric in all examples, and further note that in some examples a predetermined area need not be cone-shaped at all. For example, the predetermined area may simply be a box of a predetermined height, width, and length in front of the first device's display. Still further, note that while dimensions may be specified in feet according to the GUI 600, other increments may also be used such as meters or centimeters.

Still in reference to FIG. 6, in some examples an input box 614 may be presented on the GUI 600. The user may input a number into the box 614 in order to establish a threshold time during which another device in UWB communication with the first device is to be within the first device's predetermined area before the first device is awoken and/or unlocked. If desired, the GUI 600 may also include another input box 616 for the user to enter another number to establish a different threshold time after the other device leaves the predetermined area for the first device to lock itself and/or enter a lower power mode.

Additionally, in some examples the GUI 600 may include an option 618 that may be selected to set or enable the first device to lock itself and/or place itself in a lower power mode if another device paired with it is in active use. For example, the option 618 may be selected to set or configure the first device to specifically execute diamond 410 and block 412 as described above.

The GUI 600 may also include an option 620. The option 620 may be selected to set or enable the first device to not require a wake-up word to activate a local voice assistant to process an ensuing voice command if another device associated with the user is inside of the predetermined area as also discussed above.

Figure 7:
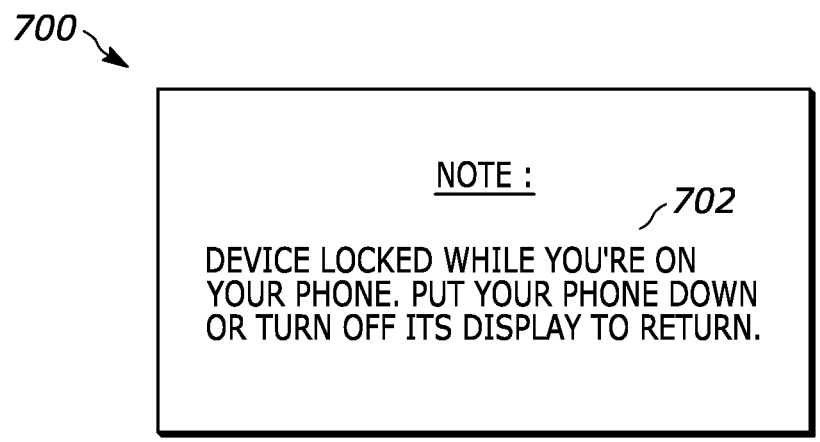

Now in reference to FIG. 7, it shows another example GUI 700 that may be presented on the display of the first device of FIG. 4 consistent with present principles. The GUI 700 may be presented on the first device's display responsive to a determination that another device paired with the first device is actively in use as set forth above. As a result, per this example the first device has been locked but has not yet been placed in a lower power mode. Accordingly, as shown the GUI 700 may include a prompt 702 indicating that the first device has been locked since the first device has identified another device paired with it (in this case, a smartphone) as being currently in use. The prompt 702 may also include instructions to put the other device down on a surface or turn off its display for the first device to unlock itself and return to a most-recently presented screen. Note that determining whether the other device has been put down on a surface may be based on orientation data transmitted wirelessly to the first device, as generated at the second device using its gyroscope or other orientation sensor. Orientation of the other device may also be determined based on UWB location tracking itself as the first device might determine based on the angle of arrival of UWB signals from the other device and the known location of UWB transceiver on the other device.

Figure 8:
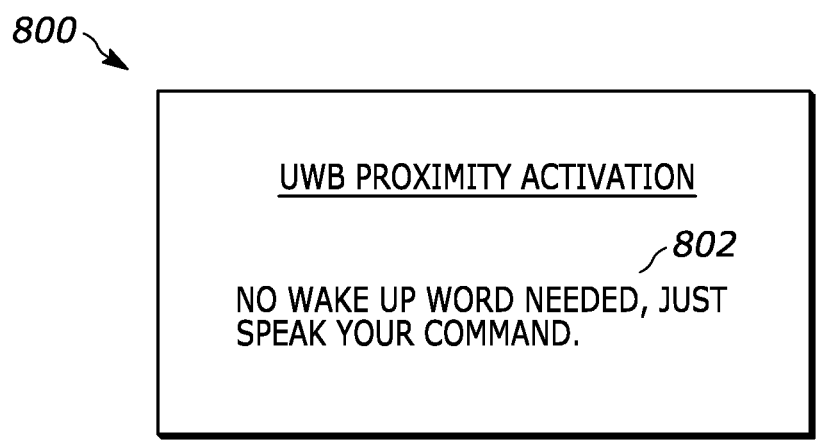

Continuing the detailed description in reference to FIG. 8, it shows yet another example GUI 800. The GUI 800 may also be presented on the display of the first device of FIG. 4 in examples where the first device is a voice-activated device. Thus, the GUI 800 may be presented responsive to the first device determining that another device with which it is communicating via UWB satisfies one or more conditions like being within a predetermined area of the first device. As shown in FIG. 8, the GUI 800 may include a prompt 802 indicating that the user need not speak a wake-up word to provide a command or other audible input to the first device's digital assistant and instead may simply speak the command/audible input.

Figure 9:
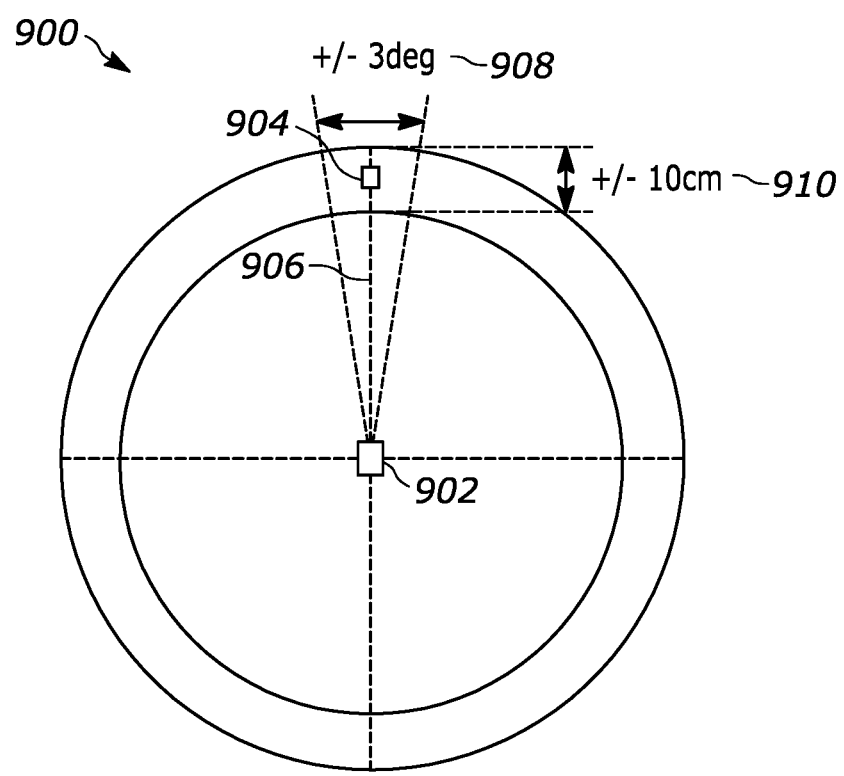
FIG. 9 shows an example illustration of UWB location accuracy consistent with present principles.

Now in reference to FIG. 9, it shows an example illustration 900 of UWB location accuracy. As shown, a first device 902 that might be executing the logic of FIG. 4 may determine a bearing 906 to a second device 904 using UWB signal exchange, which may be accurate to plus/minus three degrees 908 or even less. Depth (distance) between the first device 902 and second device 904 may also be determined using UWB to plus/minus ten centimeters 910 or even less. Thus, the device 902 may determine the location of the device 904 relative to the device 902 with relatively high accuracy. So, for example, the device 902 may determine whether the second device 904 comes within a predetermined area as set forth above to determine whether the first device should be awakened and/or unlocked consistent with present principles.

Moving on from FIG. 9, it is to be further understood that UWB-based awakening and/or unlocking of a given device may be performed for multiple different end-users. For instance, suppose a family of four shares a personal computer (PC) in a common area of their personal residence. Each family member may have their own smartphone for UWB location tracking and may report, via UWB signals, a device identification (ID) and/or user ID for their respective smartphone so that the PC may track the different devices by device/user ID.

In accordance with this example, different rules or rule sets may be implemented for each user. For example, a husband and wife may both have administrator privileges for the PC and so when their respective smartphones are detected via UWB as being within the predetermined area for the PC and/or satisfying a motion vector condition as set forth above, the PC may be both awakened and unlocked. However, if either of the children from the family were to come within the predetermined area and/or satisfy the motion vector condition with their own smartphones, they may have lesser privileges and as a result the PC may awaken or simply return from a screen saver to a desktop or home screen but still require input of a password or passcode to unlock the PC.

It may now be appreciated that present principles provide for an improved computer-based user interface that increases the functionality, accuracy, and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A first device, comprising:
   at least one processor;
   an ultra-wideband (UWB) transceiver accessible to the at least one processor; and
   storage accessible to the at least one processor and comprising instructions executable by the at least one processor to:
   track a location of a second device different from the first device using one or more UWB signals received from the second device via the UWB transceiver;
   responsive to a determination, based on the tracking of the location of the second device, that the second device is within a predetermined area of the first device, one or more of: unlock the first device, awaken the first device;

determine that the second device is currently being used by a user; and responsive to the determination that the second device is currently being used by the user, lock the first device notwithstanding the second device being currently within the predetermined area.

2. The first device of claim 1, comprising a display accessible to the at least one processor, and wherein the predetermined area is an area in a particular direction relative to a front of the display of the first device.

3. The first device of claim 1, wherein the predetermined area is an area extending from a particular side of the first device but not all sides of the first device.

4. The first device of claim 1, wherein the instructions are executable to:

responsive to the determination that the second device is within the predetermined area of the first device, unlock the first device so that the first device can be used by the user without the user entering a passcode or password to unlock the first device.

5. The first device of claim 1, wherein the instructions are executable to:

responsive to the determination that the second device is within the predetermined area of the first device, awaken the first device.

6. The first device of claim 5, wherein the first device is awakened from one or more of: a sleep state, hibernate state, an off state.

7. The first device of claim 5, comprising a display accessible to the at least one processor, and wherein the first device is awakened at least by controlling the display to go from a state in which the display is not presenting one or more images to a state in which the display is presenting one or more images.

8. The first device of claim 1, wherein the instructions are executable to:

responsive to a determination, based on the tracking of the location of the second device, that the second device is within the predetermined area of the first device for at least a threshold non-zero amount of time, one or more of: unlock the first device, awaken the first device.

9. The first device of claim 1, wherein the determination that the second device is currently being used by the user is a determination made in a first instance, and wherein the instructions are executable to:

determine, in a second instance, that the second device is currently being used by the user; and responsive to the determination in the second instance that the second device is currently being used by the user, place the first device in a lower power mode notwithstanding the second device being currently within the predetermined area, the lower power mode comprising one or more of: a sleep state, hibernate state, an off state.

10. The first device of claim 1, wherein the determination that the second device is currently being used by the user is a determination made in a first instance, and wherein the instructions are executable to:

determine, in a second instance, that the second device is currently being used by the user; and responsive to the determination in the second instance that the second device is currently being used by the user, place the first device in a lower power mode notwithstanding the second device being currently within the predetermined area, the lower power mode comprising the display not presenting one or more images.

11. The first device of claim 1, wherein the first device is a voice-activated device, and wherein the instructions are executable to:

responsive to the determination that the second device is within the predetermined area of the first device, process audible input of a command without receiving a wake-up word to process the audible input, the wake-up word being different from the audible input.

12. The first device of claim 1, comprising a display accessible to the at least one processor, wherein the instructions are executable to:

responsive to the determination that the second device is currently being used by the user, present a prompt on the display, the prompt indicating that the first device has been locked based on the second device currently being used by the user.

13. A method, comprising:

tracking, using a first device, a location of a second device different from the first device using ultra-wideband (UWB) communication;

based on the tracking of the location of the second device, one or more of: unlocking the first device, awakening the first device;

determining that the second device is currently being used by a user; and responsive to determining that the second device is currently being used by the user, locking the first device notwithstanding the second device being within a predetermined area of the first device.

14. The method of claim 13, comprising:

based on the tracking of the location of the second device, determining that at least one condition has been met; and based on the at least one condition being met, one or more of: unlocking the first device, awakening the first device.

15. The method of claim 14, wherein the at least one condition being met comprises the second device being within the predetermined area of the first device.

16. The method of claim 15, wherein the predetermined area is an area in front of a display of the first device, the predetermined area not comprising any area behind the display of the first device.

17. The method of claim 16, comprising:

determining that the second device is outside the predetermined area for at least a threshold amount of time; and responsive to determining that the second device is outside the predetermined area for at least the threshold amount of time, one or more of: locking the first device, placing the first device in a lower power mode.

18. The method of claim 14, wherein the at least one condition being met comprises a motion vector for the second device indicating motion toward a display of the first device, the motion toward the display being motion orthogonal to a front face of the display plus or minus fifteen degrees, the motion vector being determined from the tracking.

19. At least one computer readable storage medium (CRSM) that is not a transitory signal, the computer readable storage medium comprising instructions executable by at least one processor to:

track a location of a first device relative to a second device using ultra-wideband (UWB) communication;

based on the tracking of the location of the first device, one or more of: unlock the second device, awaken the second device;

determine that the first device is currently being used by a user; and responsive to the determination that the first device is currently being used by the user, lock the second device notwithstanding the first device being currently within a predetermined area of the second device.

20. The CRSM of claim 19, wherein the instructions are executable to:

based on the tracking of the location of the first device, determine that the first device is not within the predetermined area of the second device for at least a threshold amount of time, the predetermined area comprising space in front of a display of the second device; and responsive to the determination that the first device is not within the predetermined area of the second device for at least the threshold amount of time, one or more of: lock the first device, place the first device in a lower power mode.

\* \* \* \* \*